United States Patent
Guo et al.

(10) Patent No.: US 11,333,643 B2
(45) Date of Patent: May 17, 2022

(54) IDENTIFICATION METHOD AND CONTENT MEASUREMENT METHOD FOR PEDIATRIC COMPOUND ENDOTHELIUM CORNEUM GIGERIAE GALLI CHEWABLE TABLET

(71) Applicant: HENAN TALOPH PHARMACEUTICAL CO., LTD., Zhengzhou (CN)

(72) Inventors: Zhonghua Guo, Zhengzhou (CN); Lizhuang Zhang, Zhengzhou (CN); Weiwei Liu, Zhengzhou (CN); Muge Qi, Zhengzhou (CN); Zhiping Zhang, Zhengzhou (CN); Bingbing Zhang, Zhengzhou (CN)

(73) Assignee: HENAN TALOPH PHARMACEUTICAL CO., LTD., Zhengzhou (CN)

( * ) Notice: Subject to any disclaimer, the term of this patent is extended or adjusted under 35 U.S.C. 154(b) by 394 days.

(21) Appl. No.: 16/629,283

(22) PCT Filed: Aug. 14, 2018

(86) PCT No.: PCT/CN2018/100339
§ 371 (c)(1),
(2) Date: Jan. 7, 2020

(87) PCT Pub. No.: WO2019/034030
PCT Pub. Date: Feb. 21, 2019

(65) Prior Publication Data
US 2020/0182840 A1    Jun. 11, 2020

(30) Foreign Application Priority Data

Aug. 16, 2017   (CN) .......................... 201710702551.6

(51) Int. Cl.
*G01N 30/94*   (2006.01)
*G01N 30/12*   (2006.01)
*G01N 30/34*   (2006.01)

(52) U.S. Cl.
CPC ............ *G01N 30/94* (2013.01); *G01N 30/12* (2013.01); *G01N 30/34* (2013.01)

(58) Field of Classification Search
CPC ......... G01N 30/94; G01N 30/12; G01N 30/34
USPC ........................................ 436/162
See application file for complete search history.

(56) References Cited

FOREIGN PATENT DOCUMENTS

| CN | 1899283 A | 1/2007 |
|---|---|---|
| CN | 101455690 A | 6/2009 |
| CN | 104749281 A | 7/2015 |
| CN | 104840866 A | 8/2015 |
| CN | 106896180 A | 6/2017 |
| CN | 107037159 A | 8/2017 |
| KR | 20050050291 A | 5/2005 |
| KR | 20130045659 A | 5/2013 |

OTHER PUBLICATIONS

Zhang, L. et al, Journal of Chromatoraphy A 2006, 1109, 273-278.*
Xie, P. et al, Journal of Chromatoraphy A 2006, 1112, 171-180.*
Chen, S.-B. et al, Journal of Chromatoraphy A 2006, 1121, 114-119.*
Cai, Y. et al, Journal of Liquid Chromatography & Related Technologies 2010, 33, 1287-1306.*
Xie, P.-S. et al., journal of Chromatography Separation Techniques 2014, 5, paper 1000249, 9 pages.*
Zhou, X. et al, Chinese Medicine 2015, 10, paper 13, 10 pages.*
International search report dated Oct. 24, 2018 from corresponding application No. PCT/CN2018/100339.
Carbonara et al., "Phytochemical analysis of a herbal tea from *Artemisia annua* L.", Journal of Pharmaceutical and Biomedical Analysis 62 (2012) 79-86.
Russo et al., "Evaluation of the coupling between ultra performance liquid chromatography and evaporative light scattering detector for selected phytochemical applications", J. Sep. Sci. 2008, 31, 2377-2387.
Peng et al., "Direct analysis of artemisinin from *Artemisia annua* L. using high-performance liquid chromatography with evaporative light scattering detector, and gas chromatography with flame ionization detector", Journal of Chromatography A, 1133 (2006) 254-258.
Ren et al., "Quality Analysis of Medicated Leaven", Chinese Journal of Modern Drug Application, vol. 4, No. 10, May 2010 (May 25, 2010), pp. 113-114.
Liu et al., "HPLC-ELSD Determination of Artemisinin in Liushengu", Central South Pharmacy, vol. 15, No. 2, Feb. 2017 (Feb. 23, 2017), pp. 225-227.
Xie et al., "Determination of artemisinin, rutin and quercetin in Massa Medicata Fermentata by HPLC", China Brewing-Analysis and Examination, 2014 vol. 33 No. 10, Serial No. 272, pp. 140-144.
Liao, "Qualitative identification of Lysimachia christinae and Corium stomachichum galli by TLC", Guide of China Medicine, Jan. 2013, vol. 11, No. 1, pp. 470-471.

* cited by examiner

*Primary Examiner* — Arlen Soderquist
(74) *Attorney, Agent, or Firm* — Hauptman Ham, LLP

(57) ABSTRACT

The present invention relates to a quality control method for a Chinese patent drug, and specifically relates to an identification method and a content measurement method for the pediatric compound Endothelium Corneum Gigeriae Galli chewable tablet. Identification is carried out by using specific thin-layer chromatographic identification conditions, and the content is measured by using specific high-performance liquid chromatographic conditions. Accordingly, the specificity and the accuracy are high, chemical components of the product can be fully reflected, the sensitivity is high, the reproducibility is high, the operations are simple, and the change condition of the product quality can be reflected more objectively, comprehensively and sensitively, so that the product quality is controlled on the whole, and comprehensive monitoring of the quality of the Chinese Drug is implemented.

18 Claims, 1 Drawing Sheet

IDENTIFICATION METHOD AND CONTENT MEASUREMENT METHOD FOR PEDIATRIC COMPOUND ENDOTHELIUM CORNEUM GIGERIAE GALLI CHEWABLE TABLET

RELATED APPLICATIONS

The present application is a National Phase of International Application Number PCT/CN2018/100339, filed Aug. 14, 2018, and claims the priority of China Application No. 201710702551.6, filed Aug. 16, 2017.

TECHNICAL FIELD

The present invention relates to a quality control method for a Chinese Traditional Medicine, and specifically relates to an identification and content measurement method for the pediatric compound Endothelium Corneum Gigeriae Galli (ECGG, Jineijin) chewable tablet.

BACKGROUND

In the prior art, the pediatric compound ECGG chewable tablet is recorded in the Chinese national registration standard [YBZ03852008], which is a Traditional Chinese Medicine product exclusively produced by Henan Taloph Pharmaceutical Co., Ltd. The formulation is as follows: ECGG 85 g, Medicated Leaven (Liushenqu) 165 g. Preparation method: pulverizing the above-mentioned two substances into fine powder, passing through a sieve, adding excipients, mixing, granulating, drying, and compressing into 1000 tablets to obtain the product. Characters: this product is a colored and shaped chewable tablet; it is fragrant and sweet. The medicinal materials in the prescription are ECGG and Medicated Leaven. Among them, ECGG is the dry inner wall of chicken gizzard. Medicated Leaven is a leaven made from co-fermentation of *polygonum glabrum* willd, *artemisia apiacea, xanthium, phaseolus calcaratus*, bitter almond, wheat bran and flour, and the main ingredients are rutin, artemisinin, xanthatin, ferulic acid and so on.

At present, the existing quality testing on the pediatric compound ECGG chewable tablet is carried out mainly in accordance with the following standards:

1) Identification: taking the fine powder of the pediatric compound ECGG chewable tablet to be measured, placing the same under a microscope to observe: the stone cells being orange-yellow, shell-shaped, the wall being thick, and the wider side having apparent pits.

2) Content measurement: taking 20 tablets of the pediatric compound ECGG chewable tablet, accurately weighing, grinding finely, taking about 2 g of the powder, accurately weighing, digesting according to the first method of the nitrogen determination in the Chinese Pharmacopoeia, and measuring according to the second method of the nitrogen determination in the Chinese Pharmacopoeia. Each tablet contains not less than 12.0 mg of nitrogen.

3) Heavy metal inspection: taking about 1.0 g of a sample for test, and performing inspection according to the second method of the heavy metal inspection in the Chinese Pharmacopoeia. The heavy metal content shall not exceed 20%.

4) Other relevant provisions under the tablet item in the Chinese Pharmacopoeia that should be complied with.

The above-mentioned quality standards have the following defects: the identification is too simple, the microscopic identification is a quality control index of only Medicated Leaven, and there is no control of ECGG; the nitrogen content measurement is simply for the control of general type component, so the specificity and reproducibility are poor, and the effective components cannot be quantitatively and comprehensively tested.

At present, there is no item of thin-layer identification or component quantitative testing in the current Chinese national standards relating to the aforesaid two medicinal materials.

SUMMARY

The object of the present invention is to provide an identification and content measurement method for the pediatric compound ECGG chewable tablet to overcome the above-mentioned defects, of which the specificity is high, the sensitivity is high, the reproducibility is high, and the quality control is reasonable. This standard method is capable of comprehensively controlling the quality of the product.

The present invention provides an identification and content measurement method for the pediatric compound ECGG chewable tablet, wherein the method comprises:

(I) a step of performing thin-layer chromatographic identification, wherein, conditions for the thin-layer chromatography are as follows: a silica gel G thin-layer plate is used as the thin-layer chromatography plate for detection, and a lower layer liquid of chloroform-ethyl acetate-methanol-water (12:3:8:1) standing at 10° C. or lower is used as a developing solvent;

(II) a step of performing content measurement by high performance liquid chromatography, wherein, conditions of the high performance liquid chromatography are as follows: an octadecylsilane-bonded silica gel is used as the stationary phase, methanol-water-glacial acetic acid in a volume ratio (85:15:0.45) is used as a mobile phase A, and acetonitrile-isopropanol-water in a volume ratio (50:20:30) is used as a mobile phase B, to perform gradient elution according to the following conditions:

| time (minutes) | mobile phase A (%) | mobile phase B (%) |
| --- | --- | --- |
| 0 | 0 | 100 |
| 12 | 0 | 100 |
| 20 | 30 | 70 |
| 32 | 85 | 15 |
| 34 | 15 | 85 |
| 46 | 15 | 85 |

Preferably, the identification step (I) further comprises a step of performing macroporous adsorption resin column chromatography on the pediatric compound ECGG chewable tablet.

Preferably, the step of performing macroporous adsorption resin column chromatography comprises: mixing the pediatric compound ECGG chewable tablet with a methanol solution having a mass fraction of 75% in a weight-to-volume ratio of 4:25, subjecting the mixture to ultrasonic treatment and then chromatography by using a macroporous adsorption resin column, preferably using an AB-8 macroporous adsorption resin column; after elution adsorption equilibrium, eluting the macroporous adsorption resin column with an ethanol solution having a mass fraction of 70% as an eluent, collecting the eluate and evaporating it to dryness, and adding an analytically pure methanol solution.

Preferably, in the identification step (I) an ECGG-methanol solution is used as a control medicinal material solution, and a ferulic acid-rutin-methanol solution as a reference solution.

Preferably, the step (I) of performing thin-layer chromatographic identification comprises:
(1) preparing a test solution from the pediatric compound ECGG chewable tablet according to the step of performing macroporous adsorption resin column chromatography;
(2) preparing an ECGG-methanol control medicinal material solution from an ECGG control medicinal material according to the step of performing macroporous adsorption resin column chromatography;
(3) adding methanol to a ferulic acid reference substance and a rutin reference substance, to prepare a ferulic acid-rutin-methanol reference solution;
(4) aspirating the above three solutions and performing identification according to the conditions for the thin-layer chromatography.

Preferably, the step (I) of performing thin-layer chromatographic identification comprises:
(1) pulverizing the pediatric compound ECGG chewable tablet, mixing the same with a methanol solution having a mass fraction of 75% in a weight-to-volume ratio of 4:25, subjecting the mixture to ultrasonic treatment for 30 minutes, and filtering, followed by AB-8 macroporous adsorption resin column chromatography, washing with water until the washing liquid is nearly colorless, and then eluting with ethanol having a mass fraction of 35% and ethanol having a mass fraction of 70% in order, collecting the eluate of 70% ethanol, evaporating to dryness, and adding methanol to dissolve it, to obtain a test solution;
(2) preparing an ECGG-methanol control medicinal material solution from an ECGG control medicinal material according to the method in step (1);
(3) preparing a mixed solution containing 0.5 mg of ferulic acid and 0.5 mg of rutin per ml as a reference solution by adding methanol to a ferulic acid reference substance and a rutin reference substance;
(4) aspirating the above three solutions and placing on a high-performance silica gel G thin-layer plate, respectively, and developing with chloroform-ethyl acetate-methanol-water in a volume ratio of 12:3:8:1 as a developing solvent, taking out and air drying, spraying a sulfuric acid ethanol solution having a mass fraction of 10%, heating at 105° C. until the spots are distinct, and observing under sunlight and ultraviolet light (365 nm), respectively.

Preferably, the content measurement step (II) further comprises a step of purifying the pediatric compound ECGG chewable tablet using a neutral alumina column.

Preferably, the step of purification using a neutral alumina column comprises: mixing the pediatric compound ECGG chewable tablet with a chromatographic pure methanol in a weight-to-volume ratio of 1:2.5, subjecting the mixture to ultrasonic treatment, purifying by a neutral alumina column, and eluting the neutral alumina column with an anhydrous ethanol solution as an eluent, collecting the eluate and evaporating to dryness, and adding the chromatographic pure methanol.

Preferably, the content measurement step (II) uses an artemisinin/p-hydroxybenzaldehyde/xanthatin/methanol solution as a reference solution.

Preferably, the content measurement step (II) by high performance liquid chromatography comprises:
(1) preparing a test solution from the pediatric compound ECGG chewable tablet through the step of purification using a neutral alumina column;
(2) adding methanol to artemisinin, p-hydroxybenzaldehyde and xanthatin reference substances, to prepare an artemisinin/p-hydroxybenzaldehyde/xanthatin/methanol mixed solution as a reference solution;
(3) aspirating the above two solutions and injecting into a high performance liquid chromatograph, and performing content measurement according to the conditions for the high performance liquid chromatography.

Preferably, the content measurement step (II) by high performance liquid chromatography comprises:
(1) pulverizing the pediatric compound ECGG chewable tablet, and mixing the same with a chromatographic pure methanol solution in a weight-to-volume ratio of 1:2.5, subjecting the mixture to ultrasonic treatment for 30 minutes, cooling and filtering, and subjecting the mixture to purification by a neutral alumina column (100 to 120 mesh), eluting with absolute ethanol, collecting the eluate and concentrating the same under reduced pressure, dissolving with the chromatographic pure methanol, filtering, to obtain a test solution;
(2) adding methanol to artemisinin, p-hydroxybenzaldehyde and xanthatin reference substances, to prepare a mixed solution containing 0.3 mg of artemisinin, 0.2 mg of p-hydroxybenzaldehyde and 0.1 mg of xanthatin per ml, as a reference solution;
(3) aspirating the above two solutions and injecting into a high performance liquid chromatograph to perform measurement, wherein the conditions for the high performance liquid chromatography are as follows: an octadecylsilane-bonded silica gel is used as a stationary phase, the column temperature is 38° C., methanol-water-glacial acetic acid in a volume ratio (85:15:0.45) is used as a mobile phase A, and acetonitrile-isopropanol-water in a volume ratio (50:20:30) is used as a mobile phase B, to perform gradient elution according to the following conditions: the flow rate of the mobile phase is 1 ml/min:

| time (minutes) | mobile phase A (%) | mobile phase B (%) |
|---|---|---|
| 0 | 0 | 100 |
| 12 | 0 | 100 |
| 20 | 30 | 70 |
| 32 | 85 | 15 |
| 34 | 15 | 85 |
| 46 | 15 | 85 |

Effects of the Present Invention

According to the present invention, identification is carried out by using specific thin-layer chromatographic identification conditions, and the content measurement is performed by using specific high-performance liquid chromatographic conditions.

Accordingly, the specificity and the accuracy are high, chemical components of the product can be fully reflected, the sensitivity is high, the reproducibility is high, the operations are simple, and the change condition of the product quality can be reflected more objectively, comprehensively and sensitively, so that the product quality is controlled on the whole, and comprehensive monitoring of the quality of the ChineseDrug is implemented.

DETAILED DESCRIPTION

Figure 1:
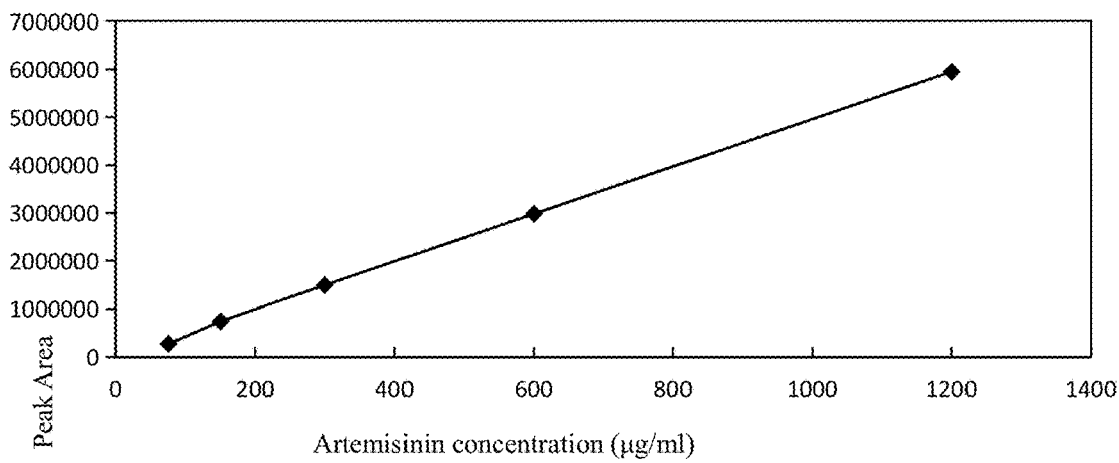
FIG. 1 is a liner inspection diagram of artemisinin reference substance.

Hereinafter, the present invention is described in detail through Examples. It will be appreciated that the Examples are described here only for illustration of the present invention rather than limiting the scope of present invention.

Example 1

1. Thin-Layer Identification of the Pediatric Compound ECGG Chewable Tablet 1.1 Instruments and Reagents Reagents: Methanol, ethanol, chloroform, ethyl acetate, sulfuric acid, which were all analytically pure, AB-8 macroporous adsorption resin column, silica gel G thin layer plate.

Sample to be Tested:
 pediatric compound ECGG chewable tablet (batch number: 1610222; 1.2 g/tablet), provided by Henan Taloph Pharmaceutical Co., Ltd.

Negative sample 1 (not containing ECGG): provided by Henan Taloph Pharmaceutical Co., Ltd.

Negative sample 2 (not containing Medicated Leaven): provided by Henan Taloph Pharmaceutical Co., Ltd.

Blank sample 3 (not containing ECGG and Medicated Leaven): provided by Henan Taloph Pharmaceutical Co., Ltd.

Reference substances: ECGG control medicinal material (batch number: 121153-201002), ferulic acid reference substance (batch number: 110773-201614), rutin reference substance (batch number: 100080-201610), which are all provided by the Chinese National Institutes for Food and Drug Control.

Instruments: ZF7C three-purpose ultraviolet analyzer, AL-204 electronic analytical balance, HQ-500DE ultrasonic cleaner; vacuum suction filtration device, (1 cm×30 cm) chromatography column, thin layer color development spray device.

1.2 Method (1) Preparation of a test solution: 10 pediatric compound ECGG chewable tablets were pulverized, and about 4 g of the result were weighed, to which 25 ml of 75% methanol was added; the mixture was subject to ultrasound for 30 minutes, and filtered, followed by AB-8 macroporous adsorption resin column chromatography (inner diameter 1.8 cm, column height 18 cm, wet packed column); the column was washed with water until the washing liquid was nearly colorless, and then eluted with 60 ml of ethanol having a mass fraction of 35% and 60 ml of ethanol having a mass fraction of 70% in order; the eluate of 70% ethanol was collected and evaporated to dryness, and 5 ml of methanol was added to dissolve the result, as the test solution.

(2) Preparation of negative sample solutions: 10 tablets of each of the negative sample 1, the negative sample 2, and the blank sample 3 were taken and made into a negative sample solution 1, a negative sample solution 2, and a blank sample solution 3 according to the preparation method of the test solution.

(3) Preparation of a reference solution: 1 g of ECGG control medicinal material was taken and made into a control medicinal material solution according to the preparation method of the test solution.

(4) Methanol was added to a ferulic acid reference substance and a rutin reference substance to prepare a mixed solution containing 0.5 mg of ferulic acid and 0.5 mg of rutin per ml, as a reference solution.

(5) Thin-layer chromatography test: 5 µl of each of the above six kinds of solutions was aspirated and placed on the same high-performance silica gel G thin-layer plate, respectively, and developed with a lower layer liquid of chloroform-ethyl acetate-methanol-water (12:3:8:1) standing at 10° C. or lower as a developing solvent; the plate was taken out and air dried and sprayed with a 10% sulfuric acid ethanol solution, heated at 105° C. until the spots were clear, and then the plate was observed under sunlight and ultraviolet light (365 nm), respectively.

1.3 Results and Conclusion

The test solution had corresponding spots at the spots of both the ECGG control medicinal material solution and the ferulic acid and rutin reference solution. The negative sample solution 1 did not have corresponding spots at the spots of the ECGG control medicinal material solution. The negative sample solution 2 did not have corresponding spots at the spots of the ferulic acid and rutin reference solution. The blank sample solution 3 did not have corresponding spots at the spots of the ECGG control medicinal material solution, and the ferulic acid and rutin reference solution.

The pediatric compound ECGG chewable tablet was identified by adopting the specific thin layer chromatography identification conditions of the present invention, and the identification method has no blank interference, and there was no mutual interference between the components, and the specificity is high and the operability is good.

2. Content Measurement Method for the Pediatric Compound ECGG Chewable Tablet 2.1 Instruments and Reagents Reagents: methanol, acetonitrile and isopropanol, which were chromatographically pure; ethanol and glacial acetic acid, which were analytically pure; neutral alumina, chromatography column.

Instruments: Agilent 1260 high performance liquid chromatograph; Agilent 1290 Infinity ELSD; AL-204 electronic analytical balance; HQ-500DE ultrasonic cleaner; DK-96-II constant temperature water bath; vacuum concentrator, (1 cm×30 cm) chromatographic column and so on.

Sample to be tested—pediatric compound ECGG chewable tablet (batch number: 1610222; 1.2 g/tablet), provided by Henan Taloph Pharmaceutical Co., Ltd.

Negative sample (not containing Medicated Leaven): provided by Henan Taloph Pharmaceutical Co., Ltd.

Reference substances: artemisinin reference substance (batch number: 100202-201606), p-hydroxybenzaldehyde reference substance (batch number: 201613), xanthatin reference substance (batch number: 201609).

2.2 Methods and Results (1) Preparation of a test solution: pediatric compound ECGG chewable tablets were ground finely, and 10 g of the result was accurately weighed and placed in a conical flask with a plug, and accurately 25 ml of methanol was added, and the flask was closed with the plug and subject to ultrasonic treatment (power of 250 W, frequency of 40 kHz) for 30 minutes; the flask was taken out and cooled, and weighed; methanol was added to make up the lost weight; the mixture was shaken up evenly and filtered; 10 ml of the successive filtrate was accurately weighed and added to a neutral alumina column (100-120 mesh, its weight was 10 g, and the inner diameter was 1 cm), eluted with 50 ml of absolute ethanol, and the eluate was collected and concentrated to dryness under reduced pressure at 50° C.; the result was dissolved with a suitable amount of chromatographic pure methanol, and then transferred to a 2 ml volumetric flask, to which chromatographically pure methanol was added to the mark; the mixture was shaken up evenly and filtered, and the successive filtrate was taken as the test solution.

(2) Preparation of a reference solution: appropriate amount of artemisinin, p-hydroxybenzaldehyde and xanthatin reference substances were accurately weighed, to which chromatographic pure methanol was added to make the mixed reference solution containing 1 mg of artemisinin, 0.2 mg of p-hydroxybenzaldehyde and 0.1 mg of xanthatin.

(3) Measurement method: 20 µl of each of the reference solution and the test solution was aspirated and injected into a liquid chromatograph to perform measurement and obtain the result. Chromatographic conditions: an octadecylsilane-bonded silica gel was used as a stationary phase, methanol-water-glacial acetic acid (85:15:0.45) was used as a mobile phase A, and acetonitrile-isopropanol-water (50:20:30) was used as a mobile phase B, and gradient elution was performed according to the specification in the following table, at a column temperature of 38° C. and a flow rate of the mobile phase of 1 ml/min; detection was carried out with an evaporative light scattering detector; the theoretical number of plates should be not less than 6000 in terms of artemisinin.

TABLE 1

| time (minutes) | mobile phase A (%) | mobile phase B (%) |
|---|---|---|
| 0 | 0 | 100 |
| 12 | 0 | 100 |
| 20 | 30 | 70 |
| 32 | 85 | 15 |
| 34 | 15 | 85 |
| 46 | 15 | 85 |

(4) Results: Each tablet of this product contained 0.016 mg of artemisinin, 0.104 mg of p-hydroxybenzaldehyde, 0.050 mg of xanthatin.

2.3 Investigation of the Content Measurement Method

2.3.1 Linear Relationship Test

Appropriate amount of artemisinin, p-hydroxybenzaldehyde and xanthatin reference substances were taken and accurately weighed, to which methanol was added to prepare mixed reference solutions 1 to 5, respectively. The concentrations of artemisinin, p-hydroxybenzaldehyde and xanthatin in each reference solution are shown in Table 1. These reference solutions were injected into a liquid chromatograph, respectively to undergo measurement according to the chromatographic conditions described in step 2.2 (3).

Linear regression was performed with the concentrations of the reference substances as the abscissa (X) and the peak areas as the ordinate (Y), to obtain linear regression equations of artemisinin, p-hydroxybenzaldehyde and xanthatin, respectively.

Figure 2:
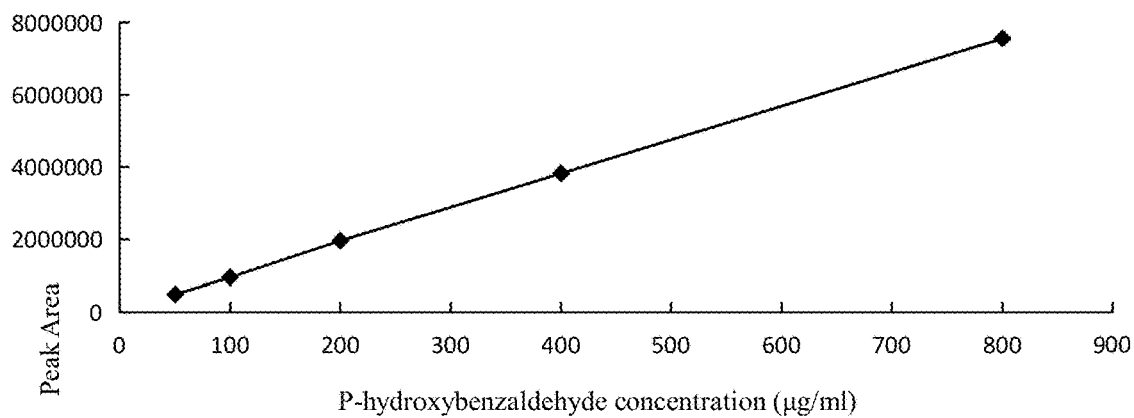
FIG. 2 is a liner inspection diagram of p-hydroxybenzaldehyde reference substance.
Figure 3:
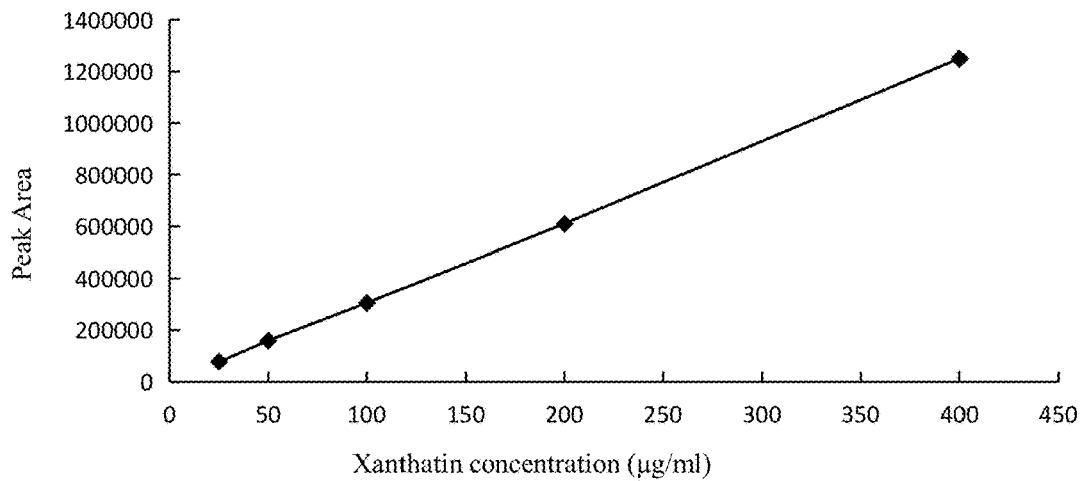
FIG. 3 is a liner inspection diagram of xanthatin reference substance.

Results: artemisinin showed a good linear relationship in the range of 1.5 µg to 24 µs, and the linear regression equation was Y=5004X−39396; p-hydroxybenzaldehyde showed a good linear relationship in the range of 1 µg to 16 µg, and the linear regression equation was Y=9426.5.X+33214; xanthatin showed a good linear relationship in the range of 0.5 µg to 8 µg, and the linear regression equation was Y=3118.9X−2778.1. The results are shown in Table 2 and FIG. 1, FIG. 2, and FIG. 3, respectively.

TABLE 2

| | Artemisinin | | P-hydroxybenzaldehyde | | xanthatin | |
|---|---|---|---|---|---|---|
| No. | Concentration (µg/ml) | Peak area | Concentration (µg/ml) | Peak area | Concentration (µg/ml) | Peak area |
| 1 | 75 | 372647.22 | 50 | 486316.33 | 25 | 76814.74 |
| 2 | 150 | 745251.40 | 100 | 949579.09 | 50 | 160423.07 |
| 3 | 300 | 1490464.74 | 200 | 1959054.2 | 100 | 305786.19 |
| 4 | 600 | 2979009.28 | 400 | 3823203.14 | 200 | 610230.3 |
| 5 | 1200 | 5949901.82 | 800 | 7559047.82 | 400 | 1249964.61 |

2.3.2 Specificity

Preparation of a negative sample solution: a negative sample (not containing Medicated Leaven) was taken and made into a negative sample solution without Medicated Leaven according to the preparation method of a test sample in step 2.2 (1).

20 µl of each of the test solution obtained in step 2.2 (1), the reference solution obtained in step (2), and the negative test solution without Medicated Leaven were accurately aspirated, respectively, and injected into a liquid chromatograph and measured according to the chromatographic conditions described in step 2.2 (3).

Results: the test solution had a corresponding peak at the same retention time as the reference solution; the negative test solution without Medicated Leaven did not have a corresponding peak at the same retention time as the reference solution. It indicates that the prominent detected component came from the Medicated Leaven, so this method has high specificity.

2.3.3 Precision

A test solution of pediatric compound ECGG chewable tablet was prepared according to the method described in step 2.2 (1). The injection was repeated 6 times into the liquid chromatograph, and the measurement was carried out according to the chromatographic conditions described in step 2.2 (3). The results are shown in Table 3.

TABLE 3

| | Artemisinin | | P-hydroxybenzaldehyde | | xanthatin | |
|---|---|---|---|---|---|---|
| Times of injection | Content (mg/tablet) | RSD (%) | Content (mg/tablet) | RSD (%) | Content (mg/tablet) | RSD (%) |
| 1 | 0.0151 | 1.11% | 0.092 | 0.96% | 0.049 | 1.55% |
| 2 | 0.0149 | | 0.094 | | 0.050 | |
| 3 | 0.0150 | | 0.092 | | 0.048 | |
| 4 | 0.0152 | | 0.093 | | 0.049 | |
| 5 | 0.0153 | | 0.093 | | 0.048 | |
| 6 | 0.0149 | | 0.094 | | 0.049 | |

According to the above results, the content measurement method of the pediatric compound ECGG chewable tablet according to the present invention has good precision.

2.3.4 Stability of the Sample Solution to be Tested

A test solution was prepared according to the preparation method described in step 2.2 (1). The test solution was placed at room temperature for 0, 2, 4, 6, 8, 12, 24 hours. At these respective time points, the content of artemisinin, p-hydroxybenzaldehyde and xanthatin in the samples was measured according to the chromatographic conditions described in step 2.2 (3), and RSD values were calculated. The results are shown in Table 4.

TABLE 4

Stability test of sample solutions for content measurement on pediatric compound ECGG chewable tablet

| | Artemisinin | | P-hydroxybenzaldehyde | | xanthatin | |
|---|---|---|---|---|---|---|
| Measuring time (h) | Content (mg/tablet) | RSD (%) | Content (mg/tablet) | RSD (%) | Content (mg/tablet) | RSD (%) |
| 0 | 0.0151 | 1.22% | 0.095 | 1.36% | 0.048 | 1.44% |
| 2 | 0.0150 | | 0.094 | | 0.049 | |
| 4 | 0.0152 | | 0.095 | | 0.048 | |
| 6 | 0.0151 | | 0.092 | | 0.047 | |
| 8 | 0.0149 | | 0.092 | | 0.048 | |
| 12 | 0.0147 | | 0.094 | | 0.048 | |
| 24 | 0.0148 | | 0.093 | | 0.049 | |

The results indicate that the test solution prepared by the method of the present invention had good stability within 24 hours at room temperature.

2.3.5 Reproducibility Test

Six parts of pediatric compound ECGG chewable tablet of batch No. 161022 were taken to prepare test solutions according to the method described in step 2.2(1), and the content was measured respectively according to the chromatographic conditions described in step 2.2 (3). The results are shown in Table 5.

TABLE 5

Reproducibility test of content measurement on pediatric compound ECGG chewable tablet

| | | Artemisinin | | P-hydroxybenzaldehyde | | xanthatin | |
|---|---|---|---|---|---|---|---|
| Parts | Sample weight (g) | Content (mg/tablet) | RSD (%) | Content (mg/tablet) | RSD (%) | Content (mg/tablet) | RSD (%) |
| 1 | 10.0055 | 0.0153 | 1.92% | 0.094 | 1.92% | 0.050 | 1.68% |
| 2 | 10.0147 | 0.0154 | | 0.095 | | 0.048 | |
| 3 | 10.0024 | 0.0148 | | 0.090 | | 0.048 | |
| 4 | 10.0009 | 0.0151 | | 0.093 | | 0.049 | |
| 5 | 10.0030 | 0.0153 | | 0.094 | | 0.048 | |
| 6 | 10.0103 | 0.0147 | | 0.092 | | 0.049 | |

The results indicate that the content measurement method of the present invention has good reproducibility.

2.3.6 Recovery Test

Six parts of pediatric compound ECGG chewable tablet samples with known content (artemisinin 0.151 mg/tablet, p-hydroxybenzaldehyde 0.093 mg/tablet, xanthatin 0.0487 mg/tablet) were accurately weighed and made into six test solutions according to the method described in step 2.2 (1). Appropriate amount of artemisinin reference substance, p-hydroxybenzaldehyde reference substance, xanthatin reference substance were accurately weighed and made into 100 ml of a mixed solution of reference substances, which contained 0.2521 mg of artemisinin, 0.1559 mg of p-hydroxybenzaldehyde and 0.0813 mg of xanthatin per ml. 2 ml of the reference substance was added to each of the six samples. The content measurement was performed according to the chromatographic conditions described in step 2.2 (3), and the recovery was calculated according to 9101 the Guidelines for the validation of analysis methods for pharmaceutical quality standards, Part IV of the Chinese Pharmacopoeia (2015 edition). The results are shown in Tables 6, 7, and 8.

Calculation Formula:

$$\text{Recovery} = \frac{\text{measured total content (mg)} - \text{original sample content (mg)}}{\text{reference substance addition amount (mg)}} \times 100\%$$

TABLE 6

Recovery results of artemisinin-added sample

| Times | Sample weight (g) | Sample content (mg) | reference substance addition amount (mg) | Measured total content (mg) | Recovery (%) | Average recovery (%) | RSD (%) |
|---|---|---|---|---|---|---|---|
| 1 | 10.0041 | 0.5035 | 0.5042 | 1.0006 | 98.59 | 99.37% | 1.02 |
| 2 | 10.0017 | 0.5034 | 0.5042 | 1.0085 | 100.18 | | |
| 3 | 10.0023 | 0.5034 | 0.5042 | 1.0119 | 100.85 | | |
| 4 | 10.0052 | 0.5036 | 0.5042 | 1.0055 | 99.54 | | |
| 5 | 9.9996 | 0.5033 | 0.5042 | 1.0019 | 98.89 | | |
| 6 | 10.0008 | 0.5034 | 0.5042 | 0.9984 | 98.18 | | |

TABLE 7

Recovery results of p-hydroxybenzaldehyde-added sample

| Times | Sample weight (g) | Sample content (mg) | reference substance addition amount (mg) | Measured total content (mg) | Recovery (%) | Average recovery (%) | RSD (%) |
|---|---|---|---|---|---|---|---|
| 1 | 10.0041 | 0.3101 | 0.3118 | 0.6235 | 100.55 | 99.51 | 1.00 |
| 2 | 10.0017 | 0.3100 | 0.3118 | 0.6195 | 99.26 | | |
| 3 | 10.0023 | 0.3101 | 0.3118 | 0.6178 | 98.69 | | |
| 4 | 10.0052 | 0.3102 | 0.3118 | 0.6174 | 98.52 | | |
| 5 | 9.9996 | 0.3100 | 0.3118 | 0.6191 | 99.13 | | |
| 6 | 10.0008 | 0.3100 | 0.3118 | 0.6247 | 100.93 | | |

TABLE 8

Recovery results of xanthatin-added sample

| Times | Sample weight (g) | Sample content (mg) | reference substance addition amount (mg) | Measured total content (mg) | Recovery (%) | Average recovery (%) | RSD (%) |
|---|---|---|---|---|---|---|---|
| 1 | 10.0041 | 0.1624 | 0.1626 | 0.3264 | 100.86 | 99.29 | 1.14 |
| 2 | 10.0017 | 0.1624 | 0.1626 | 0.3225 | 98.46 | | |
| 3 | 10.0023 | 0.1624 | 0.1626 | 0.3259 | 100.55 | | |
| 4 | 10.0052 | 0.1624 | 0.1626 | 0.3221 | 98.22 | | |
| 5 | 9.9996 | 0.1623 | 0.1626 | 0.3234 | 99.08 | | |
| 6 | 10.0008 | 0.1623 | 0.1626 | 0.3226 | 98.59 | | |

To sum up, the content measurement method of the pediatric compound ECGG chewable tablet according to the present invention has high specificity, high precision, good reproducibility, and is capable of effectively controlling the product quality.

Comparative Examples 1 to 6

Identification on the pediatric compound ECGG chewable tablet was carried out according to the method described in 1.2 of Example 1, except that the developing solvent used in Example 1 was replaced by the following developing solvents:
 a. ethyl acetate-formic acid-water (8:1:1)
 b. chloroform-acetone (95:5)
 c. n-butanol-glacial acetic acid-water (7:1:1)
 d. n-butanol-glacial acetic acid-water (8:2:1)
 e. n-butanol-ethanol-glacial acetic acid-water (4:1:1:2)
 f. chloroform-ethyl acetate-methanol-formic acid (40:5:10:0.2)

As a result, there was a negative interference under the condition of the developing solvent b, and the spots could not be completely and effectively separated under the conditions of developing solvents a, c, d, e, and f.

Comparative Examples 7 to 10

Content measurement on the pediatric compound ECGG chewable tablet was carried out according to the method described in 2.2 of Example 1, except that the mobile phases and elution conditions used in Example 1 were replaced with the following mobile phases and elution conditions, respectively:

a. Octadecylsilane-bonded silica gel was used as a filler, methanol-water-glacial acetic acid (85:15:0.45) was used as the mobile phase A, and n-hexane-isopropanol-water (20:50:30) was used as the mobile phase B, and gradient elution was performed according to the specification in the table below.

| time (minutes) | mobile phase A (%) | mobile phase B (%) |
|---|---|---|
| 0 | 0 | 100 |
| 10 | 0 | 100 |
| 60 | 100 | 0 | b. Octadecylsilane-bonded silica gel was used as a filler, methanol was used as the mobile phase A, and 0.4% phosphoric acid was used as the mobile phase B, and gradient elution was performed according to the specification in the table below.

| time (minutes) | mobile phase A (%) | mobile phase B (%) |
|---|---|---|
| 0 | 100 | 0 |
| 10 | 80 | 20 |
| 60 | 55 | 45 | c. Octadecylsilane-bonded silica gel was used as a filler, and acetonitrile: 0.2% acetic acid (60:40) was the mobile phase.

d. Octadecylsilane-bonded silica gel was used as a filler, methanol-water-glacial acetic acid (85:15:0.45) was used as the mobile phase A, and acetonitrile-isopropanol-water (50:20:30) was used as the mobile phase B, and gradient elution was performed according to the specification in the table below.

| time (minutes) | mobile phase A (%) | mobile phase B (%) |
|---|---|---|
| 0 | 0 | 100 |
| 10 | 0 | 100 |
| 60 | 100 | 0 |

Detection on the reference solution and the test solution was respectively carried out in the condition of the above-mentioned mobile phases a to c. As a result, both methods b and c had unexpressed main peaks; the retention time of method a was relatively late, the mobile phase span had a large gradient, and the peak shape was poor. In the case of method d, the main peak of each component was clear, but the peak shape was poor.

Although preferable embodiments of the present invention have been described above, the present invention is not limited to the details in the embodiments described above. A plurality of simple variants of the technical solutions of the present invention that can be made within the scope of the technical concept of the present invention all pertain to the protection scope of the present invention.

The invention claimed is:
1. An identification and content measurement method for the pediatric compound Endothelium Corneum Gigeriae Galli (ECGG) chewable tablet, wherein the method comprises:
 (I) a step of performing thin-layer chromatographic identification, wherein,
 conditions for the thin-layer chromatography are as follows: a silica gel G thin-layer plate is used as the thin-layer chromatography plate for detection, and a lower layer liquid of chloroform-ethyl acetate-methanol-water (12:3:8:1) standing at 10° C. or lower is used as a developing solvent;
 (II) a step of performing content measurement by high performance liquid chromatography, wherein,
 conditions of the high performance liquid chromatography are as follows: an octadecylsilane-bonded silica gel is used as the stationary phase, methanol-water-glacial acetic acid in a volume ratio (85:15:0.45) is used as a mobile phase A, and acetonitrile-isopropanol-water in a volume ratio (50:20:30) is used as a mobile phase B, to perform gradient elution according to the following conditions:

| time (minutes) | mobile phase A (%) | mobile phase B (%) |
|---|---|---|
| 0 | 0 | 100 |
| 12 | 0 | 100 |
| 20 | 30 | 70 |
| 32 | 85 | 15 |
| 34 | 15 | 85 |
| 46 | 15 | 85. |

2. The identification and content measurement method for the pediatric compound ECGG chewable tablet according to claim 1, wherein, the identification step (I) further comprises a step of performing macroporous adsorption resin column chromatography on the pediatric compound ECGG chewable tablet.

3. The identification and content measurement method for the pediatric compound ECGG chewable tablet according to claim 2, wherein, the step of performing macroporous adsorption resin column chromatography comprises: mixing the pediatric compound ECGG chewable tablet with a methanol solution having a mass fraction of 75% in a weight-to-volume ratio of 4:25, subjecting the mixture to ultrasonic treatment and then chromatography by using a macroporous adsorption resin column, preferably using an AB-8 macroporous adsorption resin column; after elution adsorption equilibrium, eluting the macroporous adsorption resin column with an ethanol solution having a mass fraction of 70% as an eluent, collecting the eluate and evaporating it to dryness, and adding an analytically pure methanol solution.

4. The identification and content measurement method for the pediatric compound ECGG chewable tablet according to claim 3, wherein, in the identification step (I) an ECGG-methanol solution is used as a control medicinal material solution, and a ferulic acid-rutin-methanol solution as a reference solution.

5. The identification and content measurement method for the pediatric compound ECGG chewable tablet according to claim 4, wherein, the step (I) of performing thin-layer chromatographic identification comprises:
   (1) preparing a test solution from the pediatric compound ECGG chewable tablet according to the step of performing macroporous adsorption resin column chromatography;
   (2) preparing an ECGG-methanol control medicinal material solution from an ECGG control medicinal material according to the step of performing macroporous adsorption resin column chromatography;
   (3) adding methanol to a ferulic acid reference substance and a rutin reference substance, to prepare a ferulic acid-rutin-methanol reference solution;
   (4) aspirating the above three solutions and performing identification according to the conditions for the thin-layer chromatography.

6. The identification and content measurement method for the pediatric compound ECGG chewable tablet according to claim 5, wherein, the step (I) of performing thin-layer chromatographic identification comprises:
   (1) pulverizing the pediatric compound ECGG chewable tablet, mixing the same with a methanol solution having a mass fraction of 75% in a weight-to-volume ratio of 4:25, subjecting the mixture to ultrasonic treatment for 30 minutes, and filtering, followed by AB-8 macroporous adsorption resin column chromatography, washing with water until the washing liquid is nearly colorless, and then eluting with ethanol having a mass fraction of 35% and ethanol having a mass fraction of 70% in order, collecting the eluate of 70% ethanol, evaporating to dryness, and adding methanol to dissolve it, to obtain the test solution;
   (2) preparing an ECGG-methanol control medicinal material solution from an ECGG control medicinal material according to the method in step (1);
   (3) preparing a mixed solution containing 0.5 mg of ferulic acid and 0.5 mg of rutin per ml as a reference solution by adding methanol to a ferulic acid reference substance and a rutin reference substance;
   (4) aspirating the above three solutions and placing on a high-performance silica gel G thin-layer plate, respectively, and developing with chloroform-ethyl acetate-methanol-water in a volume ratio of 12:3:8:1 as a developing solvent, taking out and air drying, spraying a sulfuric acid ethanol solution having a mass fraction of 10%, heating at 105° C. until the spots are distinct, and observing under sunlight and ultraviolet light (365 nm), respectively.

7. The identification and content measurement method for the pediatric compound ECGG chewable tablet according to claim 6, wherein, the content measurement step (II) by high performance liquid chromatography comprises:
   (1) pulverizing the pediatric compound ECGG chewable tablet, and mixing the same with a chromatographic pure methanol solution in a weight-to-volume ratio of 1:2.5, subjecting the mixture to ultrasonic treatment for 30 minutes, cooling and filtering, and subjecting the mixture to purification by a neutral alumina column (100 to 120 mesh), eluting with absolute ethanol, collecting the eluate and concentrating the same under reduced pressure, dissolving with the chromatographic pure methanol, filtering, to obtain a test solution;
   (2) adding methanol to artemisinin, p-hydroxybenzaldehyde and xanthatin reference substances, to prepare a mixed solution containing 0.3 mg of artemisinin, 0.2 mg of p-hydroxybenzaldehyde and 0.1 mg of xanthatin per ml, as a reference solution;
   (3) aspirating the above two solutions and injecting into a high performance liquid chromatograph to perform measurement, wherein the conditions for the high performance liquid chromatography are as follows: an octadecylsilane-bonded silica gel is used as a stationary phase, the column temperature is 38° C., methanol-water-glacial acetic acid in a volume ratio (85:15:0.45) is used as a mobile phase A, and acetonitrile-isopropanol-water in a volume ratio (50:20:30) is used as a mobile phase B, to perform gradient elution according to the following conditions; the flow rate of the mobile phase is 1 ml/min

| time (minutes) | mobile phase A (%) | mobile phase B (%) |
|---|---|---|
| 0 | 0 | 100 |
| 12 | 0 | 100 |
| 20 | 30 | 70 |
| 32 | 85 | 15 |
| 34 | 15 | 85 |
| 46 | 15 | 85. |

8. The identification and content measurement method for the pediatric compound ECGG chewable tablet according to claim 5, wherein, the content measurement step (II) further comprises a step of purifying the pediatric compound ECGG chewable tablet using a neutral alumina column, the step of purification using a neutral alumina column comprises: mixing the pediatric compound ECGG chewable tablet with a chromatographic pure methanol in a weight-to-volume ratio of 1:2.5, subjecting the mixture to ultrasonic treatment, purifying by a neutral alumina column, and eluting the neutral alumina column with an anhydrous ethanol solution as an eluent, collecting the eluate and evaporating to dryness, and adding the chromatographic pure methanol,
   the content measurement step (II) uses an artemisinin/p-hydroxybenzaldehyde/xanthatin/methanol solution as a reference solution,
   and the content measurement step (II) by high performance liquid chromatography comprises:
   (1) preparing a test solution from the pediatric compound ECGG chewable tablet through the step of purification using a neutral alumina column;
   (2) adding methanol to artemisinin, p-hydroxybenzaldehyde and xanthatin reference substances, to prepare an artemisinin/p-hydroxybenzaldehyde/xanthatin/methanol mixed solution as a reference solution;
   (3) aspirating the above two solutions and injecting into a high performance liquid chromatograph, and performing content measurement according to the conditions for the high performance liquid chromatography.

9. The identification and content measurement method for the pediatric compound ECGG chewable tablet according to claim 4, wherein, the content measurement step (II) further comprises a step of purifying the pediatric compound ECGG chewable tablet using a neutral alumina column, the step of purification using a neutral alumina column comprises: mixing the pediatric compound ECGG chewable tablet with a chromatographic pure methanol in a weight-to-volume ratio of 1:2.5, subjecting the mixture to ultrasonic treatment, purifying by a neutral alumina column, and eluting the neutral alumina column with an anhydrous ethanol solution as an eluent, collecting the eluate and evaporating to dryness, and adding the chromatographic pure methanol.

10. The identification and content measurement method for the pediatric compound ECGG chewable tablet according to claim 9, wherein, the content measurement step (II) uses an artemisinin/p-hydroxybenzaldehyde/xanthatin/methanol solution as a reference solution.

11. The identification and content measurement method for the pediatric compound ECGG chewable tablet according to claim 1, wherein, in the identification step (I) an ECGG-methanol solution is used as a control medicinal material solution, and a ferulic acid-rutin-methanol solution as a reference solution.

12. The identification and content measurement method for the pediatric compound ECGG chewable tablet according to claim 1, wherein, the step (I) of performing thin-layer chromatographic identification comprises:
  (1) preparing a test solution from the pediatric compound ECGG chewable tablet according to the step of performing macroporous adsorption resin column chromatography;
  (2) preparing an ECGG-methanol control medicinal material solution from an ECGG control medicinal material according to the step of performing macroporous adsorption resin column chromatography;
  (3) adding methanol to a ferulic acid reference substance and a rutin reference substance, to prepare a ferulic acid-rutin-methanol reference solution;
  (4) aspirating the above three solutions and performing identification according to the conditions for the thin-layer chromatography.

13. The identification and content measurement method for the pediatric compound ECGG chewable tablet according to claim 12, wherein, the step (I) of performing thin-layer chromatographic identification comprises:
  (1) pulverizing the pediatric compound ECGG chewable tablet, mixing the same with a methanol solution having a mass fraction of 75% in a weight-to-volume ratio of 4:25, subjecting the mixture to ultrasonic treatment for 30 minutes, and filtering, followed by AB-8 macroporous adsorption resin column chromatography, washing with water until the washing liquid is nearly colorless, and then eluting with ethanol having a mass fraction of 35% and ethanol having a mass fraction of 70% in order, collecting the eluate of 70% ethanol, evaporating to dryness, and adding methanol to dissolve it, to obtain the test solution;
  (2) preparing an ECGG-methanol control medicinal material solution from an ECGG control medicinal material according to the method in step (1);
  (3) preparing a mixed solution containing 0.5 mg of ferulic acid and 0.5 mg of rutin per ml as a reference solution by adding methanol to a ferulic acid reference substance and a rutin reference substance;
  (4) aspirating the above three solutions and placing on a high-performance silica gel G thin-layer plate, respectively, and developing with chloroform-ethyl acetate-methanol-water in a volume ratio of 12:3:8:1 as a developing solvent, taking out and air drying, spraying a sulfuric acid ethanol solution having a mass fraction of 10%, heating at 105° C. until the spots are distinct, and observing under sunlight and ultraviolet light (365 nm), respectively.

14. The identification and content measurement method for the pediatric compound ECGG chewable tablet according to claim 1, wherein, the content measurement step (II) further comprises a step of purifying the pediatric compound ECGG chewable tablet using a neutral alumina column.

15. The identification and content measurement method for the pediatric compound ECGG chewable tablet according to claim 14, wherein, the step of purification using a neutral alumina column comprises: mixing the pediatric compound ECGG chewable tablet with a chromatographic pure methanol in a weight-to-volume ratio of 1:2.5, subjecting the mixture to ultrasonic treatment, purifying by a neutral alumina column, and eluting the neutral alumina column with an anhydrous ethanol solution as an eluent, collecting the eluate and evaporating to dryness, and adding the chromatographic pure methanol.

16. The identification and content measurement method for the pediatric compound ECGG chewable tablet according to claim 1, wherein, the content measurement step (II) uses an artemisinin/p-hydroxybenzaldehyde/xanthatin/methanol solution as a reference solution.

17. The identification and content measurement method for the pediatric compound ECGG chewable tablet according to claim 1, wherein, the content measurement step (II) by high performance liquid chromatography comprises:
  (1) preparing a test solution from the pediatric compound ECGG chewable tablet through the step of purification using a neutral alumina column;
  (2) adding methanol to artemisinin, p-hydroxybenzaldehyde and xanthatin reference substances, to prepare an artemisinin/p-hydroxybenzaldehyde/xanthatin/methanol mixed solution as a reference solution;
  (3) aspirating the above two solutions and injecting into a high performance liquid chromatograph, and performing content measurement according to the conditions for the high performance liquid chromatography.

18. The identification and content measurement method for the pediatric compound ECGG chewable tablet according to claim 1, wherein, the content measurement step (II) by high performance liquid chromatography comprises:
  (1) pulverizing the pediatric compound ECGG chewable tablet, and mixing the same with a chromatographic pure methanol solution in a weight-to-volume ratio of 1:2.5, subjecting the mixture to ultrasonic treatment for 30 minutes, cooling and filtering, and subjecting the mixture to purification by a neutral alumina column (100 to 120 mesh), eluting with absolute ethanol, collecting the eluate and concentrating the same under reduced pressure, dissolving with the chromatographic pure methanol, filtering, to obtain a test solution;
  (2) adding methanol to artemisinin, p-hydroxybenzaldehyde and xanthatin reference substances, to prepare a mixed solution containing 0.3 mg of artemisinin, 0.2 mg of p-hydroxybenzaldehyde and 0.1 mg of xanthatin per ml, as a reference solution;
  (3) aspirating the above two solutions and injecting into a high performance liquid chromatograph to perform measurement, wherein the conditions for the high performance liquid chromatography are as follows: an octadecylsilane-bonded silica gel is used as a stationary phase, the column temperature is 38° C., methanol-water-glacial acetic acid in a volume ratio (85:15:0.45) is used as a mobile phase A, and acetonitrile-isopropanol-water in a volume ratio (50:20:30) is used as a mobile phase B, to perform gradient elution according to the following conditions; the flow rate of the mobile phase is 1 ml/min

| time (minutes) | mobile phase A (%) | mobile phase B (%) |
|---|---|---|
| 0 | 0 | 100 |
| 12 | 0 | 100 |
| 20 | 30 | 70 |
| 32 | 85 | 15 |
| 34 | 15 | 85 |
| 46 | 15 | 85. |

* * * * *